United States Patent
Suzuki (10) Patent No.: US 9,549,369 B2
(45) Date of Patent: Jan. 17, 2017

(54) COMMUNICATION DEVICE (71) Applicant: DENSO CORPORATION, Kariya, Aichi-pref. (JP)

(72) Inventor: Tadao Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 141 days.

(21) Appl. No.: 14/660,158

(22) Filed: Mar. 17, 2015

(65) Prior Publication Data
US 2015/0282065 A1 Oct. 1, 2015

(30) Foreign Application Priority Data

Mar. 27, 2014 (JP) ................ 2014-066238

(51) Int. Cl.
*H04W 52/02* (2009.01)
*H04L 29/08* (2006.01)
*H04W 4/04* (2009.01)

(52) U.S. Cl.
CPC .............. *H04W 52/02* (2013.01); *H04L 67/12* (2013.01); *H04W 4/046* (2013.01)

(58) Field of Classification Search
CPC ... H04B 1/1615; H04B 1/3822; H04B 1/3827; H04B 10/07; H04L 29/08; H04L 12/2644; H04L 41/06; H04L 43/0823; H04W 4/02; H04W 4/025; H04W 64/00; H04W 64/003; H04W 4/04; G01S 5/0009; G01S 5/0018; G01S 5/0289
See application file for complete search history.

(56) References Cited

U.S. PATENT DOCUMENTS

| 2002/0158754 | A1 | 10/2002 | Tabata et al. |
| 2006/0012462 | A1 | 1/2006 | Teshima et al. |
| 2006/0244577 | A1 | 11/2006 | Tanaka et al. |
| 2007/0261653 | A1 | 11/2007 | Yagyu |
| 2008/0147265 | A1* | 6/2008 | Breed ............... G07C 5/0808 701/424 |
| 2010/0299001 | A1* | 11/2010 | Suzuki ............... H04W 88/02 701/2 |

(Continued)

FOREIGN PATENT DOCUMENTS

| JP | 61-128153 | 8/1986 |
| JP | 9-139709 | 5/1997 |

(Continued)

*Primary Examiner* — Benjamin H Elliott, IV
(74) *Attorney, Agent, or Firm* — Harness, Dickey & Pierce, P.L.C.

(57) ABSTRACT

A communication device has an information transmission setting process that obtains state information indicative of a self-vehicle state, and determines whether the state information satisfies a transmission stop condition for stopping a transmission of position information. Further, based on the obtained state information, the process determines whether the self-vehicle is in an abnormal state indicative of an abnormality of the self-vehicle. Then, if the preset transmission stop condition is satisfied and the abnormal state is not detected, the process stops the transmission of the position information. If the preset transmission stop condition is satisfied and the abnormal state is already detected, the process allows a periodic transmission of the position information.

14 Claims, 6 Drawing Sheets

(56) References Cited

U.S. PATENT DOCUMENTS

| | | | |
|---|---|---|---|
| 2013/0154358 A1* | 6/2013 | Kai | B60R 16/0232 307/9.1 |
| 2014/0244104 A1* | 8/2014 | Tan | H04B 1/3822 701/36 |
| 2015/0282065 A1* | 10/2015 | Suzuki | H04L 67/12 370/311 |
| 2015/0288402 A1* | 10/2015 | Yukizaki | H04B 1/1027 455/85 |

FOREIGN PATENT DOCUMENTS

| | | |
|---|---|---|
| JP | 2000-52901 | 2/2000 |
| JP | 2001-40921 | 2/2001 |
| JP | 2001-328580 | 11/2001 |
| JP | 2004-078614 | 3/2004 |
| JP | 2004-163232 | 6/2004 |
| JP | 2006-023909 | 1/2006 |
| JP | 2006-142910 | 6/2006 |
| JP | 2006-151000 | 6/2006 |
| JP | 2007-58796 | 3/2007 |
| JP | 2007-303427 | 11/2007 |
| JP | 2008-041358 | 2/2008 |
| JP | 2008-96346 | 4/2008 |
| JP | 2011-87174 | 4/2011 |

* cited by examiner

COMMUNICATION DEVICE

CROSS REFERENCE TO RELATED APPLICATION

The present application is based on and claims the benefit of priority of Japanese Patent Application No. 2014-066238, filed on Mar. 27, 2014, the disclosure of which is incorporated herein by reference.

TECHNICAL FIELD

The present disclosure generally relates to a communication device installed in a movable object.

BACKGROUND INFORMATION

Conventionally, a communication apparatus may notify the position of a self-vehicle to other communication devices outside of the self-vehicle. The communication apparatus may periodically transmit at preset intervals the position information such as the current position of a self-vehicle, for example, as described in a patent document 1 (i.e., Japanese Patent Laid-Open No. JP-A-2006-23909).

Such a communication device may be configured to continue such a periodic transmission of the position information at the preset intervals to the other communication device after the stopping of the internal-combustion engine in the self-vehicle.

However, when the internal-combustion engine is stopped as mentioned above, the communication device will usually operate on electric power stored in the in-vehicle battery.

For this reason, when the communication device repeatedly transmits the position information even after the stopping of the internal-combustion engine, the consumption of electric power stored in the in-vehicle battery increases, which is undesirable. That is, for an in-vehicle communication device that is configured to transmit information after the stopping of the internal-combustion engine, it is necessary to control the consumption of electric power in the in-vehicle battery.

SUMMARY

It is an object of the present disclosure to provide a communication device that reduces power consumption while transmitting the required information.

In an aspect of the present disclosure, the communication device is installed in a movable object to perform information communication with an other communication device. The communication device includes a vehicle state obtainer obtaining state information indicative of a state of the movable object, a position obtainer obtaining position information that includes a position of the movable object, a stop condition determiner determining whether external information incoming from an external device satisfies a preset transmission stop condition for stopping a transmission of information via the information communication, an abnormality detector detecting that the movable object is in an abnormal state based on the state information obtained by the vehicle state obtainer, and a transmission controller performing the transmission of position information according to a satisfaction of the preset transmission stop condition.

When the transmission controller determines that (i) the stop condition determiner has determined that the preset transmission stop condition is satisfied and (ii) the abnormality detector has not detected the abnormal state, the transmission controller stops the transmission of the position information obtained from the position obtainer. When the transmission controller determines that (i) the stop condition determiner has determined that the preset transmission stop condition is satisfied and (ii) the abnormality detector has detected the abnormal state, the transmission controller performs the transmission of the position information obtained from the position obtainer as the information communication.

Also, in an aspect of the present disclosure, the abnormality detector detects the abnormal state of the movable object when the state information obtained from the vehicle state obtainer is an accident-fault state that indicates at least one of an abnormality of the movable object or an accident involving the movable object.

Further, in an aspect of the present disclosure, the vehicle state obtainer obtains the state information based on an operation state of a hazard lamp switch that switches ON/OFF a hazard lamp on the movable object, and the abnormality detector detects the accident-fault state based on the state information indicating a switch ON operation state of the hazard lamp switch.

Additionally, in an aspect of the present disclosure, the vehicle state obtainer obtains the state information based on a deployment state of an airbag, and the abnormality detector detects the accident-fault state based on the state information indicating that the airbag is deployed.

Still further, in an aspect of the present disclosure, the vehicle state obtainer obtains the state information indicating whether an other device installed in the movable object has a fault, and the abnormality detector detects the accident-fault state based on the state information indicating that the other device has a fault.

Moreover, in an aspect of the present disclosure, the abnormality detector detects the abnormal state when the state information from the vehicle state obtainer indicates that the movable object is in a stolen state.

Yet further, in an aspect of the present disclosure, the vehicle state obtainer obtains the state information indicating whether the movable object is in the stolen state from the other communication device operating outside of the movable object.

In addition, in an aspect of the present disclosure, the vehicle state obtainer obtains, from a theft prevention device that is installed in the movable object, the state information based on the state information indicating whether the movable object is in the stolen state.

Even further, in an aspect of the present disclosure, the movable object is an automobile, the vehicle state obtainer obtains an open-closed state of a door of the movable object as the state information, and the abnormality detector detects the abnormal state as the state information of the vehicle state obtainer indicating that the door of the movable object is in an open state.

Also, in an aspect of the present disclosure, the external device is an internal combustion engine, and the stop condition determiner determines that the preset transmission stop condition is satisfied when the external information incoming from the external device in the movable object indicates that the engine is stopped.

Further, in an aspect of the present disclosure, when the external information is information regarding whether a transmission of the position information is required, which is indicated by an operation state of a transmission controller operation switch that is installed in the movable object, the stop condition determiner determines that the preset transmission stop condition is satisfied if the external information incoming from the transmission controller operation switch indicates that the transmission of the position information is not required.

Additionally, in an aspect of the present disclosure, the stop condition determiner determines based on external information that is transmitted from the other communication device and indicative of whether the other communication device is allowed to transmit position information, and the stop condition determiner determines that the preset transmission stop condition is satisfied when the external information that is transmitted from the other communication device indicates that the transmission of the position information is prohibited.

Still further, in an aspect of the present disclosure, the movable object is an automobile, and the transmission controller stops the transmission of the position information when the position information from the position obtainer indicates that a current position of the movable object is not on a road. Moreover, in an aspect of the present disclosure, the vehicle state obtainer repeatedly obtains the state information, the position obtainer repeatedly obtains the position information, the stop condition determiner determines whether the state information satisfies the preset transmission stop condition when the stop condition determiner obtains the state information, and the transmission controller is equipped with a transmission interval adjuster that (i) performs the transmission of position information at predetermined intervals when the stop condition determiner determines that the preset transmission stop condition is satisfied and the abnormality detector detects the abnormal state, and (ii) sets a longer transmission interval in proportion to an amount of a lapse time after the detection of the abnormal state by the abnormality detector when the stop condition determiner determines that the preset transmission stop condition is satisfied and the abnormality detector detects the abnormal state.

From among those components described above, the vehicle state obtainer obtains state information indicative of a state of the movable object that has the communication device installed therein. The position obtainer obtains position information that includes a position of the movable object. The stop condition determiner determines whether external information incoming from an external device which is a different device than the communication device satisfies a preset transmission stop condition for stopping a transmission of information via the information communications.

Further, the abnormality detector detects that the movable object is in an abnormal state based on the state information obtained by the vehicle state obtainer. Then, the transmission controller performs the transmission of information according to satisfaction of the preset transmission stop condition. That is, when the controller determines that the preset transmission stop condition is satisfied by the determiner and the abnormal state is not detected by the detector, the controller stops the transmission of the obtained position information, and when the controller determines that the preset transmission stop condition is satisfied by the determiner and the abnormal state is detected by the detector, the controller performs the transmission of the obtained position information as the information communications.

Even when the preset transmission stop condition is satisfied, the communication device of the present disclosure performs the transmission of the position information as information and telecommunications in case that an abnormal state is detected. That is, in other words, according, to the communication device of the present disclosure, when the movable object has an abnormality and the transmission of the position information is desirable (i.e., is in an abnormal state), the position information is transmitted. Therefore, when the other movable object traveling around the movable object has the compatible communication device that is capable of receiving the transmitted position information, the position of the movable object in the abnormal state is notified to and recognized by an occupant of the other movable object, for example.

On the other hand, when the preset transmission stop condition is satisfied and the abnormal state is not detected, the communication device of the present disclosure stops the transmission of the position information, determining that there is low necessity to transmit the position information.

Therefore, according to the communication device of the present disclosure, unnecessary transmission of the position information prevented and the power consumption is reduced.

According to the above configuration, the communication device of the present disclosure can reduce the power consumption, while transmitting the required information.

Further, the abnormality detector may be configured to detect the abnormal state of the movable object, when the obtained state information from the vehicle state obtainer is an accident-fault state that indicates at least one of a fault of the movable object and an accident of the movable object.

According to the communication device of the present disclosure, in a movable body, when the obtained state information from the vehicle state obtainer is an accident-fault state that indicates at least one of a fault of the movable object and an accident of the movable object, the abnormal state of the movable object is detected. Therefore, when at least one of the fault or the accident is caused in the movable object, the position information of such movable object can be transmitted to the other communication device.

As a result, according to the communication device of the present disclosure, an occupant or the like of the other movable object that has the other communication device installed therein can recognize the position of the faulty movable object of the position of the accident, which contributes to and realizes a safer road/traffic environment.

Further, the stop condition determiner may be configured to determine that the preset transmission stop condition is satisfied when the external information is an engine state incoming from an internal combustion engine in the movable object, and the external information regarding the engine state indicates that the engine is stopping.

According to such a communication device, the engine stopping state in the movable object may be considered as the satisfaction of the preset transmission stop condition. Therefore, when the internal-combustion engine is stopped and electric power is supplied to the communication device in the movable object, the transmission of the information is stopped if the abnormal state is not detected.

As a result, the power consumption of the communication device is reduced. In particular, according to the communication device of the present disclosure, the consumption of electric power stored in the battery is reduced.

The numerals in the parentheses within the "What is claimed is:" section and "Detailed Description" section represent an example relationship between a concrete object in the description of the embodiment mentioned later and a recitation in the claims, which does not necessarily limit a technical scope of the present disclosure.

Further, the present disclosure is realizable in various forms, for example, as a computer program, a communications procedure, etc. which is performed by a computer for transmitting the position information in addition to the communication device mentioned above.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described with reference to the drawings.

<Communication System>

Figure 1:
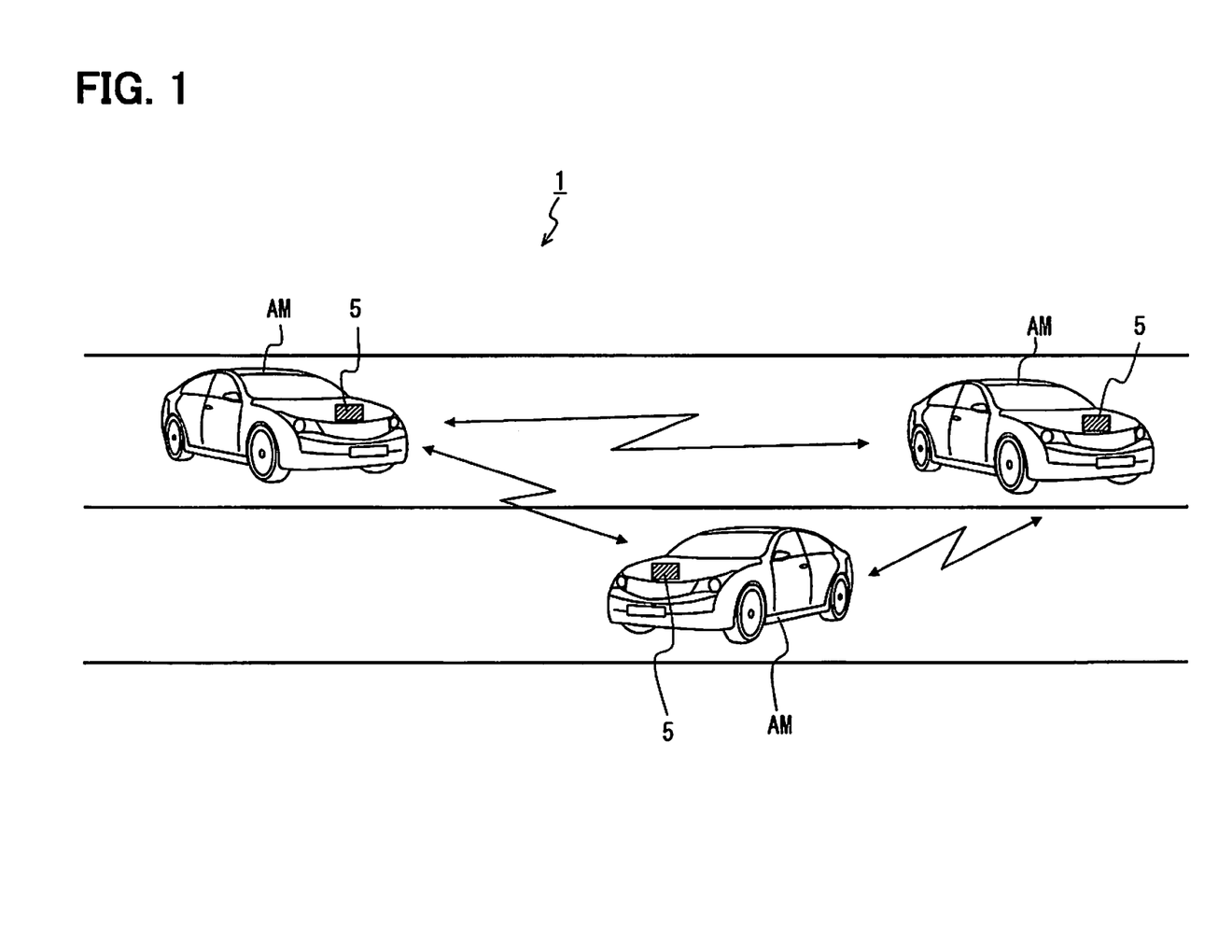
FIG. 1 is an illustration of a communication system that includes a communication device of the present disclosure.

A communication system 1 shown in FIG. 1 is a system which is provided with an in-vehicle system 5 carried in an automobile AM, and transmits and receives a variety of information by a vehicle-to-vehicle communication.

Figure 2:
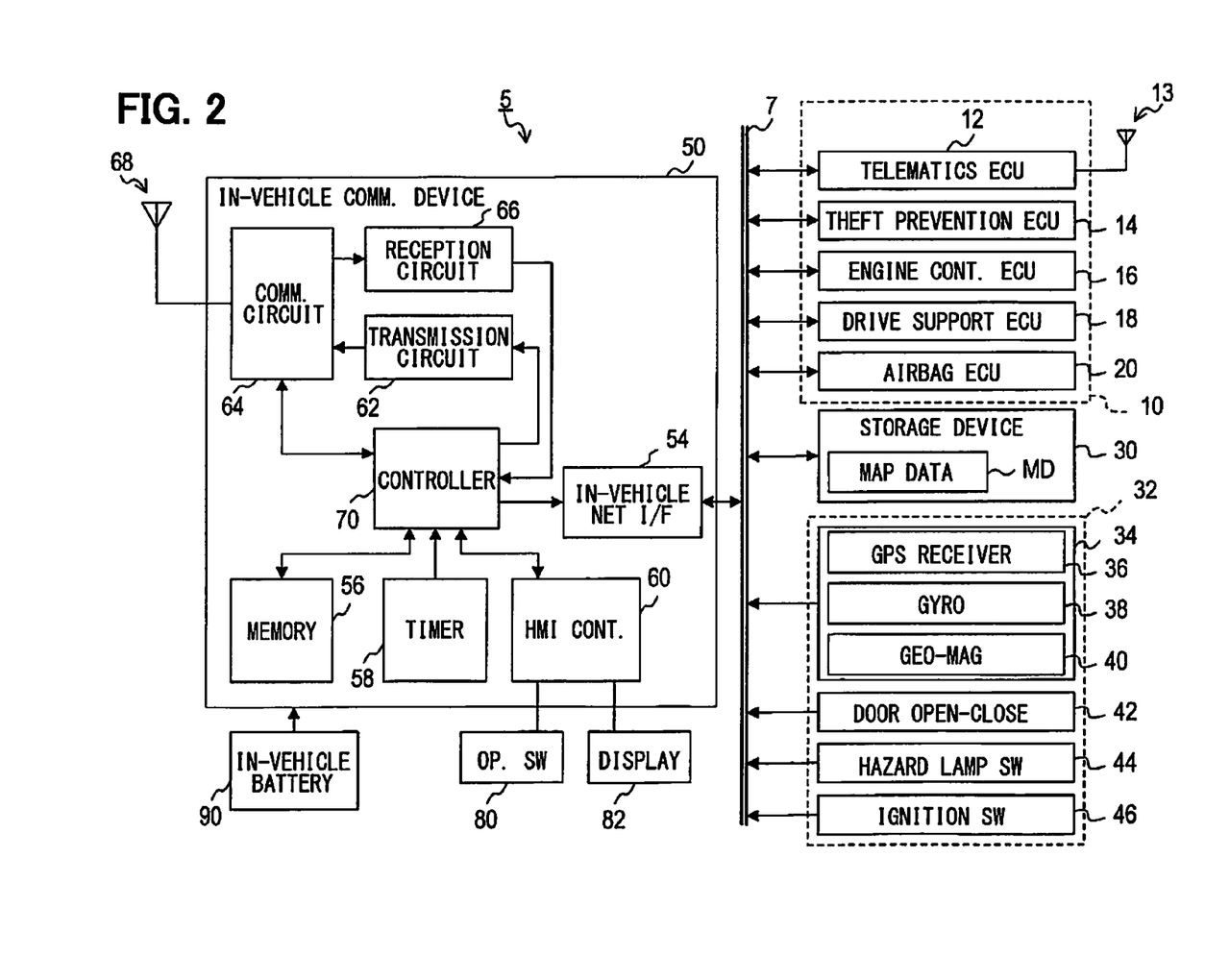
FIG. 2 is a block diagram of an in-vehicle system that includes the communication devices of the present disclosure.

The in-vehicle system 5 is provided with a group of electrical control units 10, a memory 30, a group of sensors 32 (i.e., a sensor group 32), and an in-vehicle communication device 50 as shown in FIG. 2. In the in-vehicle system 5 of the present embodiment, a group of electrical control units 10, the memory 30, the group of sensors 32, and the in-vehicle communication device 50 are connected via an in-vehicle network 7. Below, one specific vehicle among the vehicles having the in-vehicle system 5 installed therein is designated as a movable object, and the other vehicles other than the movable object are designated as the other vehicles.

Each of the electrical control units (i.e., "ECU" hereafter) contained in the group of electrical control units 10 is constituted as a well-known microcomputer that has a CPU together with ROM, RAM, and the like, and is further provided with a bus controller for performing communication via a LAN communication bus at least.

The group of electrical control units 10 is provided with a telematics ECU 12, a theft prevention ECU 14, an engine control ECU 16, a drive support ECU 18, and an airbag ECU 20. Theft prevention ECU 14 determines whether the movable object is stolen, and, when the vehicle is stolen, notifies theft to other ECUs 12, 16, 18, and 20 or outputs an alarm to the outside of the vehicle. Theft prevention ECU 14 may be configured to determine that the vehicle is stolen when the windowpane of the movable object is broken, for example. Further, theft prevention ECU 14 may also be configured to determined that the vehicle is stolen when an internal-combustion engine carried in the movable object starts to operate even though a vehicle ID and an ID in an electronic key are not matching in the movable object.

The engine control ECU 16 controls the internal-combustion engine and fuel injection equipment which are carried in the movable object. The drive support ECU 18 performs a driving support control which improves the safety of a travel of the movable object. The driving support control includes, for example, a well-known adaptive cruise control and a cruise control, a pre-crash safety system, and a lane keeping assistance.

In order to realize such driving support control, an in-vehicle control device and an in-vehicle apparatus which are not illustrated are connected to the drive support ECU 18 via the LAN communication bus. The in-vehicle control device mentioned above at least includes a brake control device and a seat belt control device. The in-vehicle apparatus mentioned above includes a warning buzzer, a monitor, a cruise control switch, a target inter-vehicle distance setting switch, and the like. The brake control device controls the braking force applied to the movable object according to a target acceleration, a brake request, and the brake state that are provided by the drive support ECU 18. The seat belt control device controls a binding force of a seat belt by driving a motor (not illustrated) when the seat belt control device receives an emergency signal which shows an un-avoidable collision of a target object with the movable object from the drive support ECU 18.

When an acceleration detected by a non-illustrated acceleration sensor and applied to the movable object is equal to or greater than a preset regulation value, the airbag ECU 20 deploys the airbag that is installed in the movable object by igniting an igniter.

The telematics ECU 12 is an ECU having a mobile communication function, which transmits and receives information via a connection through an antenna 13 to a mobile communication system (i.e., a portable telephone network) and provides various services for the occupant of the movable object via the in-vehicle equipment carried in the movable object. The telematics ECU 12 may transmit and receive information not only via transmission and reception of the information through a mobile communication system but via the in-vehicle communication device 50.

As the service (i.e., hereafter designated as "telematics") which is realized by the telematics ECU 12 in the present embodiment, a notification of the information, such as the road traffic information, may be considered, which is obtained via the mobile communication system, for example.

Further, as the telematics, when the movable object is stolen, theft of the movable object may be notified to the telematics service provider via the mobile communication system, for example, and, the tracking of the current position of the stolen vehicle may be performed.

A storage device 30 is implemented as a rewritable non-volatile storage (e.g., a hard disk drive, a flash memory, etc.). The storage device 30 stores map data MD in advance. The map data MD includes: node data about a node which represents each of specific points (e.g., an intersection, a turning point, etc.) on a road; link data about a link of each road which connects two nodes; cost data about a unit cost assigned in advance to each link, road data, topographical data, mark data, intersection data, facility data, guidance voice data, voice recognition data, and the like.

<Sensor Group>

The sensor group 32 is either a switch or a sensor for obtaining various information regarding the movable object, and at least includes a position sensing device 34, a door open-closed sensor 42, a hazard lamp switch (SW) 44, and an ignition switch (SW) 46.

Among these, the position sensing device 34 detects the current position (i.e., latitude, longitude) of the movable object as well as the travel direction relative to the NSEW orientation, and is provided with a well-known GPS receiver 36, a gyro sensor 38, and a geo-magnetic field sensor 40 at least.

The door open-closed sensor 42 is a well-known sensor which detects whether the door of the movable object is in a door-opening state or in a door-closing state, or (i.e., an open-closed state).

The hazard lamp SW 44 is a well-known switch which switches an ON and an OFF of the hazard lamp carried in the movable object.

The ignition SW 46 switches, by its turning ON and OFF, operation and non-operation of the internal-combustion engine, which is also a well-known switch.

In addition, as the sensors in the sensor group 32, an acceleration sensor which detects the acceleration of the movable object, a speed sensor which detects a vehicle speed of the movable object, etc. may be included.

<In-Vehicle Communication Device>

The in-vehicle communication device 50 performs information communications with the in-vehicle communication device carried in the other vehicle by the vehicle-to-vehicle communication.

The in-vehicle communication device 50 has an in-vehicle network interface (I/F) 54, a memory unit 56, a timer circuit 58, a human machine interface (HMI) control unit 60, a transmission information processor 62, a wireless communicator 64, a reception information processor 66, and a controller 70.

The in-vehicle network interface 54 performs transmission and reception of information via the in-vehicle network 7 among the group of electrical control units 10, the storage device 30, and the sensor group 32.

The memory unit 56 is a rewritable nonvolatile storage device (e.g., a hard disk drive, a flash memory, etc.). The variety of information obtained from the group of electrical control units 10 is memorized by the memory unit 56. The variety of information includes an entry of information regarding whether the telematics service is permitted or forbidden (for the movable object).

The timer circuit 58 is a well-known circuit which measures time.

The HMI control unit 60 receives an input of information from the connected apparatuses, and outputs a signal to the connected apparatuses. The HMI control unit 60 in the present embodiment has an operation switch (SW) 80 and a display unit 82 connected thereto. The operation SW 80 is a switch which inputs information regarding whether transmission of the information via the in-vehicle communication device 50 is required. The display unit 82 is a well-known equipment which displays information. The display unit 82 displays, for example, position information received from the in-vehicle communication device in the other vehicle or the like.

The transmission information processor 62 is a well-known circuit, which converts the information from the controller 70 into the communications data used for the vehicle-to-vehicle communication.

The wireless communicator 64 is a well-known circuit, which transmits the communications data converted by the transmission information processor 62 via an antenna 68 and receives the communications data from the in-vehicle communication device carried in the other vehicle.

The reception information processor 66 is a well-known circuit, which converts the communications data received by the wireless communicator 64 into the information which can be processed by the controller 70.

The controller 70 is a well-known control device having a well-known microcomputer as a main component, with ROM, RAM, and CPU. The ROM of the controller 70 stores a processing program executed by the controller 70, which is to perform an information transmission setting process that sets a transmission setting of whether the position information including the current position of the movable object is periodically transmitted from the in-vehicle communication device 50.

The in-vehicle communication device 50 of the present embodiment is connected to an in-vehicle battery 90. Via a connection between the in-vehicle battery 90 and the in-vehicle communication device 50, an electric power is supplied from the in-vehicle battery 90 to the in-vehicle communication device 50, even when the ignition SW 46 is turned OFF.

<Information Transmission Setting Process>

Next, the information transmission setting process which is performed by the controller 70 of the in-vehicle communication device 50 is described.

The information transmission setting process is started when a preset start instruction specified in advance is input, and it is periodically performed at a preset interval thereafter.

Figure 3:
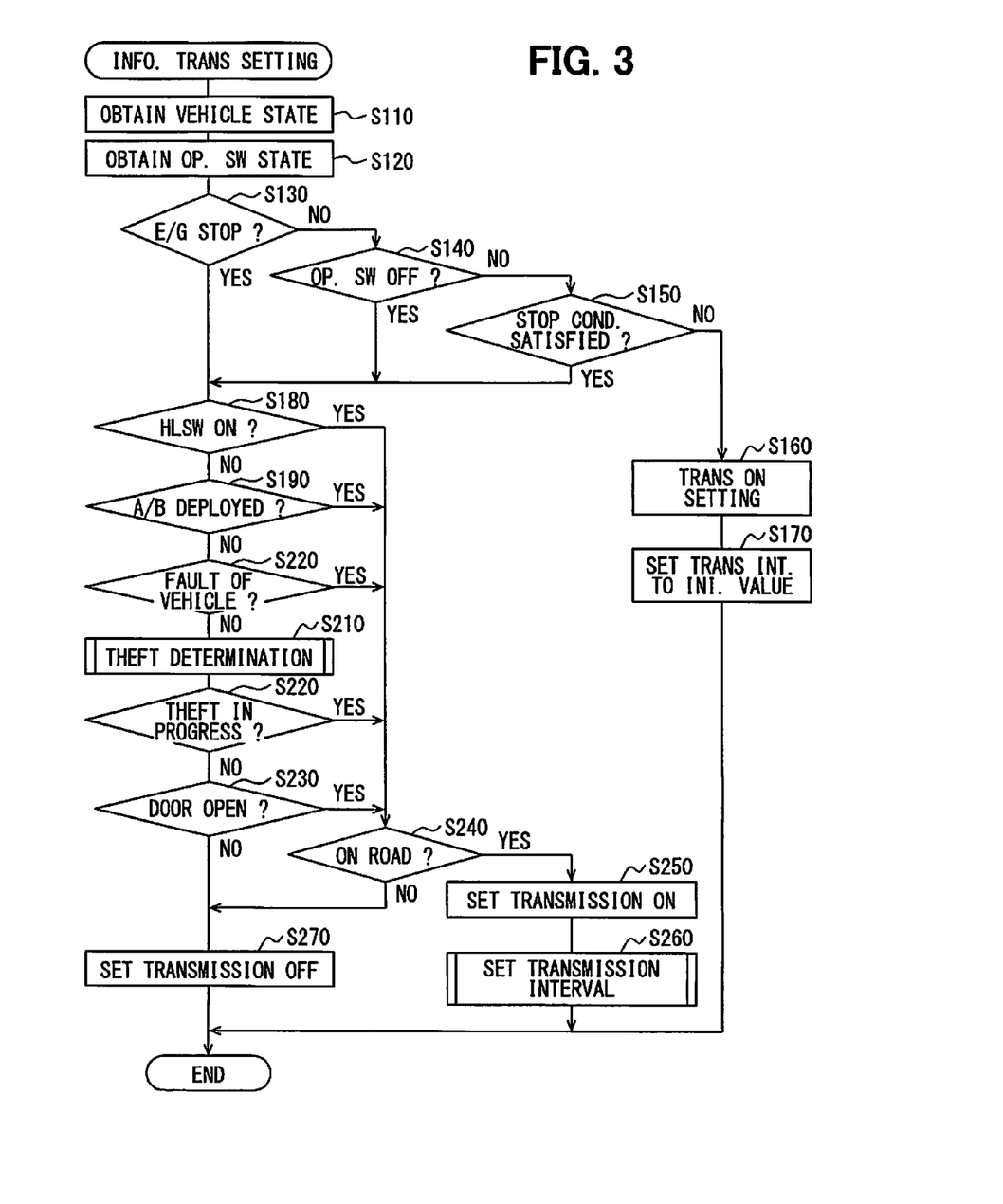
FIG. 3 is a flowchart of an information transmission process that is performed by the communication device.

When the information transmission setting process is started as shown in FIG. 3, the state information regarding a state of the movable object is first obtained from the group of electrical control units 10 and the sensor group 32 (S110). The state information obtained in S110 includes the information from the group of electrical control units 10 and the information from the sensor group 32. The information from the group of electrical control units 10 includes a variety of information from the telematics ECU 12, as well as a notification from theft prevention ECU 14 that theft of the movable object is in progress, a notification from the airbag ECU 20 that the airbag is deployed and a result of self-diagnosis from each of the ECUs 12, 14, 16, 18, and 20. The information from the sensor group 32 includes the operation state of the hazard lamp SW 44, the operation state of the ignition SW 46, the current position and the travel direction of the movable object detected by the position sensing device 34, and the door open-closed state from the door open-closed sensor 42.

Then, the operation state of the operation SW 80 is obtained (S120). Further, in the information transmission setting process, it is determined whether the internal-combustion engine (i.e., engine) carried in the movable object is stopped based on the state information obtained in S110 (S130). When it is determined that the internal-combustion engine is stopped as a result of a determination (S130:YES), the controller 70 shifts the information transmission setting process to S180 that is mentioned later in detail.

On the other hand, as a result of the determination, when the internal-combustion engine is operating (S130:NO), the controller 70 determines whether the information transmission is required based on the operation state of the operation SW 80 obtained in S120 (S140). That is, in S140, when the operation SW 80 is OFF, it is determined that information transmission is not required, and when the operation SW 80 is ON, it is determined that information transmission is required.

When information transmission is not required as a result of the determination by S140 (S140:YES), the controller 70 shifts the information transmission setting process to S180.

On the other hand, when information transmission is determined as required as a result of the determination (S140:NO), the controller 70 determines whether a preset stop condition is satisfied (S150). The stop condition described here is a prohibition of information transmission from the in-vehicle communication device 50 according to the information transmitted from the other communication device. The stop condition in the present embodiment may be, for example, a prohibition of providing a vehicle-to-vehicle communication service as a service charge management. That is, when the information on the prohibition of providing the vehicle-to-vehicle communication service is stored in the memory unit 56, it is determined in S150 that the stop condition is satisfied (S150:YES).

Then, when it is determined that, as a result of determination in S150, the stop condition is satisfied (S150:YES), the controller 70 shifts the information transmission setting process to S180.

On the other hand, when it is determined that the stop condition is not satisfied as a result of the determination in S150 (S150:NO), the information transmission setting process shifts to S160.

That is, in S130 to S150, external information which is the information inputted from a device different from the in-vehicle communication device 50 is determined as to whether the external information satisfies a preset transmission stop condition that is a preset condition for stopping transmission of the information via the information communications. If the preset transmission stop condition is satisfied as a result of the determination, the process shifts to S180, and, if the preset transmission stop condition is not satisfied, the process shifts to S160.

In S160, the controller 70 sets a transmission setting to ON so that a periodic transmission of the position information is permitted. Then, in the information transmission setting process, the controller 70 sets the transmission interval of the position information to an initial value (S170). Then, the controller 70 ends the information transmission setting process, and stands by until the next start timing. Further, unless the transmission setting and a transmission interval are changed, the controller 70 repeatedly generates the position information including the current position (i.e., latitude, longitude) of the movable object at the transmission interval set up in S170, and outputs the position information to the transmission information processor 62.

The transmission information processor 62 converts the position information into the communications data, and outputs the data to the wireless communicator 64. Then, the antenna 68 transmits the communications data from the wireless communicator 64 toward an outside of the device 50.

The position information may include a variety of information other than the current position of the movable object, such as a travel direction, a speed, a situation of the movable object and the like.

Further, in S180, the controller 70 determines whether the hazard lamp SW (HLSW in FIG. 3) 44 is ON. The process shifts to S180 when the internal-combustion engine stops (S130:YES), when the operation SW 80 is OFF (S140:YES), and when the stop condition is satisfied (S150:YES).

And if the hazard lamp SW 44 is determined as ON as a result of the determination (S180:YES), the controller 70 shifts the information transmission setting process to S240 that is mentioned later in detail.

On the other hand, when the hazard lamp SW 44 is OFF as a result of the determination (S180:NO), the controller 70 determines whether the airbag in the movable object is deployed (S190). When the airbag is deployed as a result of the determination in S190 (S190:YES), the controller 70 shifts the information transmission setting process to S240.

When the airbag is not deployed as a result of a determination (S190:NO), the controller 70 determines whether a fault is caused in each of the ECUs 12, 14, 16, 18, and 20 which constitutes the group of electrical control units 10 (S200). The determination in S200 as to whether a fault is caused is performed according to a result of the self-diagnosis function which determines whether an abnormality (i.e., a fault) has occurred to an electrical control unit (ECU) itself, which is well-known in the art.

When a fault is determined as being caused in any one of the ECUs 12, 14, 16, 18, and 20 as a result of the determination (S200:YES), the controller 70 shifts the information transmission setting process to S240.

When none of the ECUs 12, 14, 16, 18, and 20 is determined as having a fault, as a result of the determination (S200:NO), the controller 70 performs a theft determination process for determining whether a theft of the movable object is in progress (S210). In theft determination process, when theft of the movable object is in progress, theft information indicative of theft of the vehicle is set to a theft state.

On the other hand, in theft determination process, when theft of the movable object is not in progress, theft information is set to a no-theft state. Theft state here means that the movable object is stolen by a thief, and the no-theft state means that the movable object is not stolen.

When theft information indicates theft state as a result of theft determination process of S210 (S220:YES), the controller 70 shifts the information transmission setting process to S240.

On the other hand, when theft information indicates the no-theft state as a result of theft determination process of S210 (S220:NO), the controller 70 determines whether the door is in a door-opening state (S230). When the door is determined to be in the door-closing state as a result of a determination (S230:NO), the controller 70 shifts the information transmission setting process to S270 that is mentioned later in detail.

On the other hand, when the door is determined to be in the door-opening state as a result of the determination by S230 (S230:YES), the controller 70 shifts the information transmission setting process to S240. The process shifts to S240, when the hazard lamp SW 44 is ON (S180:YES), when the airbag is developed (S190:YES), when a fault is caused in any one of the ECUs 12, 14, 16, 18, and 20 (S200:YES), and when the movable object is in theft (S220:YES).

That is, in S180 to S230, it is determined whether the preset transmission stop condition is satisfied and whether the movable object is having abnormality, i.e., is in an abnormal state.

Then, it is further determined in S240 whether the movable object is on a road by matching the current position (i.e., latitude, longitude) of the movable object with map data MD obtained from the storage device 30. When the movable object is on a road as a result of the determination in S240 (S240:YES), the controller 70 sets the transmission setting to ON so that a periodic transmission of the position information is permitted (S250). Then, the controller 70 performs a transmission interval setting process which sets up the transmission interval of the position information (S260). Then, the controller 70 ends the information transmission setting process, and stands by until the next start timing.

At the transmission interval set up in S260, the controller 70 periodically generates the position information including the current position (i.e., latitude, longitude) of the movable object, and outputs the position information to the transmission information processor 62. The transmission information processor 62 converts the position information into communications data, and outputs the data to the wireless communicator 64. Then, the antenna 68 transmits the communications data from the wireless communicator 64 toward an outside of the device 50.

The position information may include a variety of information other than the current position of the movable object, such as a travel direction, a speed, a situation of the movable object and the like. The variety of information may indicate an abnormality of the movable object (i.e., an abnormal state of the movable object), or may indicate the contents of such abnormality.

Further, when the movable object is determined as not being on a road as a result of the determination in S240 (S240:NO), the controller 70 shifts the information transmission setting process to S270. The process also shifts to S270 when the door is in the door-closing state (S230:NO).

In S270, the transmission setting is set to OFF so that a periodic transmission of the position information is stopped. Then, the controller 70 ends the information transmission setting process, and stands by until the next start timing.

When the transmission setting is set to OFF in S270, the controller 70 does not transmit the position information, unless the transmission setting is changed.

<Theft Determination Process>

Figure 4:
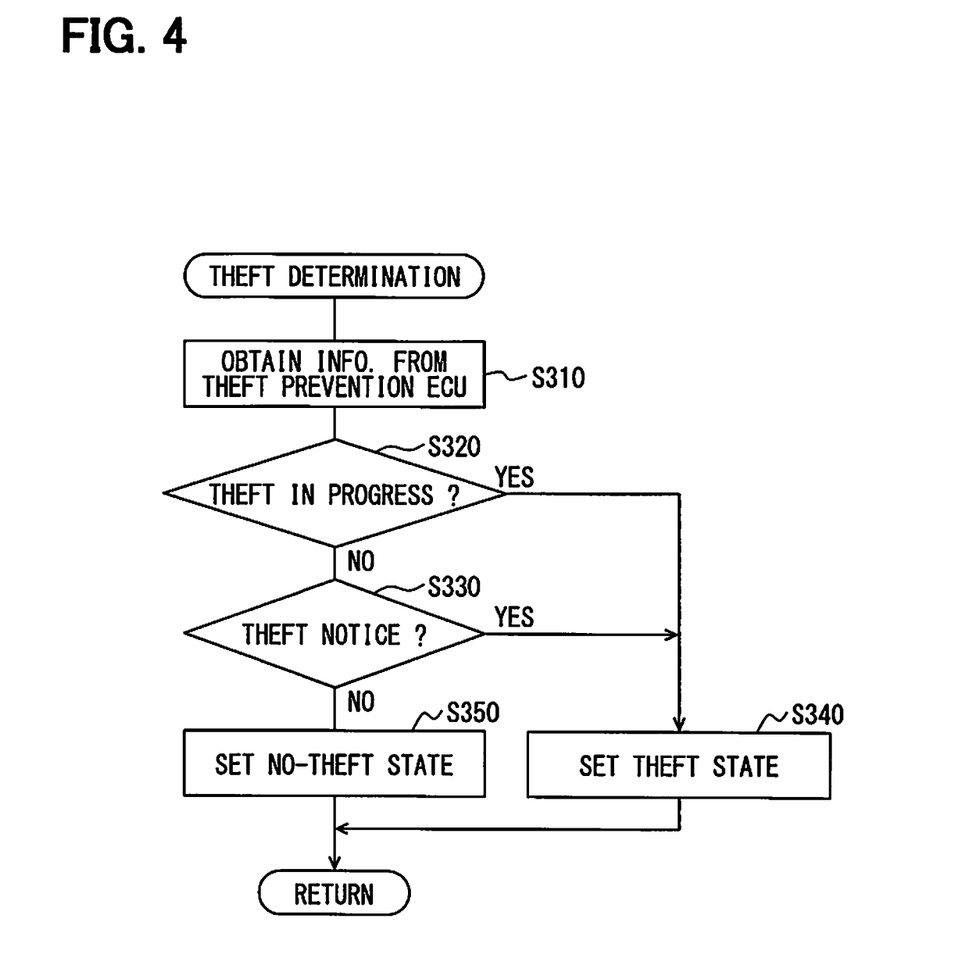
FIG. 4 is a flowchart of a theft determination process in the information transmission process.

In theft determination process performed in S210 of the information transmission setting process, when the process is started, the controller 70 first obtains, as shown in FIG. 4, the result of a determination regarding whether the movable object is in theft from theft prevention ECU 14 (S310). Then, it is determined whether the determined result obtained from theft prevention ECU 14 in S310 indicates that the movable object is in theft (S320).

When the determination result in S320 indicates that the movable object is in theft (S320:YES), the controller 70 sets theft information to theft state (S340). Then, the present theft determination process is ended and the process shifts to S220 of the information transmission setting process.

On the other hand, the determination result in S320 indicates that the movable object is not in theft (S320:NO), it is determined whether a notification regarding a theft of the movable object is received from the telematics ECU 12 (S330). When a notification of a theft of the movable object is determined as received as a result of the determination in S330 (S330:YES), theft information is set to theft state (S340). Then, the present theft determination process is ended and the process shifts to S220 of the information transmission setting process.

When a notification of a theft of the movable object has not been received as a result of the determination in S330 (S330:NO), theft information is set to the no-theft state (S350). Then, the present theft determination process is ended and the process shifts to S220 of the information transmission setting process.

That is, in theft determination process of the present embodiment, whether the movable object is in theft is determined based on the notification of theft of the movable object from the telematics ECU 12, which serves as a result of determination whether the movable object is in theft by theft prevention ECU 14. Further, in theft determination process, when the movable object is in theft, theft information is set to theft state. On the other hand, in theft determination process, when the movable object is not in theft, theft information is set to the no-theft state.

<Transmission Interval Setting Process>

Figure 5:
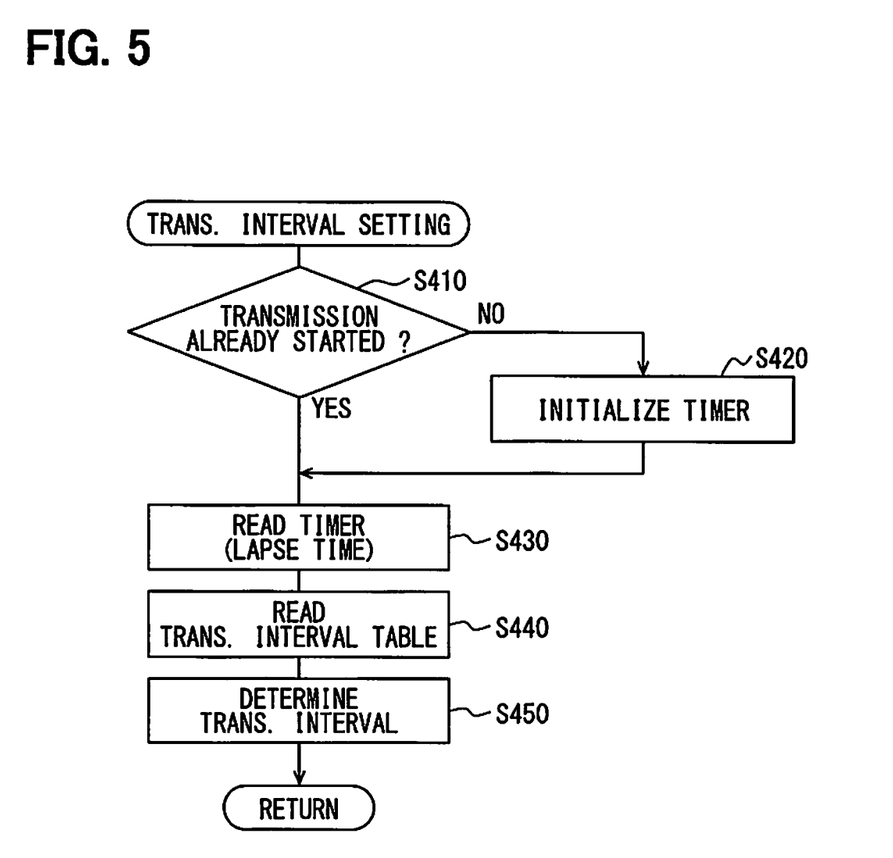
FIG. 5 is a flowchart of a transmission interval setting process in the information transmission process.

In the transmission interval setting process performed in S260 of the information transmission setting process, when it is started, the controller 70 first determines, as shown in FIG. 5, whether transmission of the position information has already been started, when the preset transmission stop condition is determined as satisfied based on a transmission stop flag (S410). The transmission stop flag here is information regarding whether the position information has already been transmitted, when the preset transmission stop condition is satisfied and the abnormal state is detected.

When the position information has not been transmitted in case that the preset transmission stop condition is satisfied and the abnormal state is detected, as a result of a determination (S410:NO), the controller 70 initializes a timer of the timer circuit 58 (i.e., set the timer value to zero '0') (420). In addition to such initialization, the controller 70 sets the transmission stop flag to a "started" value that indicates that transmission of the position information has already been started when the preset transmission stop condition is satisfied and the abnormal state is detected (S420). Then, the process shifts to S430.

The timer measures a lapse time from a start timing when the present transmission interval setting process is started when the preset transmission stop condition is satisfied and the abnormal state is detected. The timer stops when the preset transmission stop condition is no longer satisfied or when the abnormal state is determined as not detected.

On the other hand, when it is determined that the preset transmission stop condition is satisfied and the abnormal state is detected as a result of a determination (S410:NO), the controller 70 shifts the transmission interval setting process to S430.

In S430, the controller 70 reads the time, i.e., obtains time (i.e., the lapse time) from the timer circuit 58 (S430). Further, the controller 70 reads a transmission interval table (S440).

Figure 6:
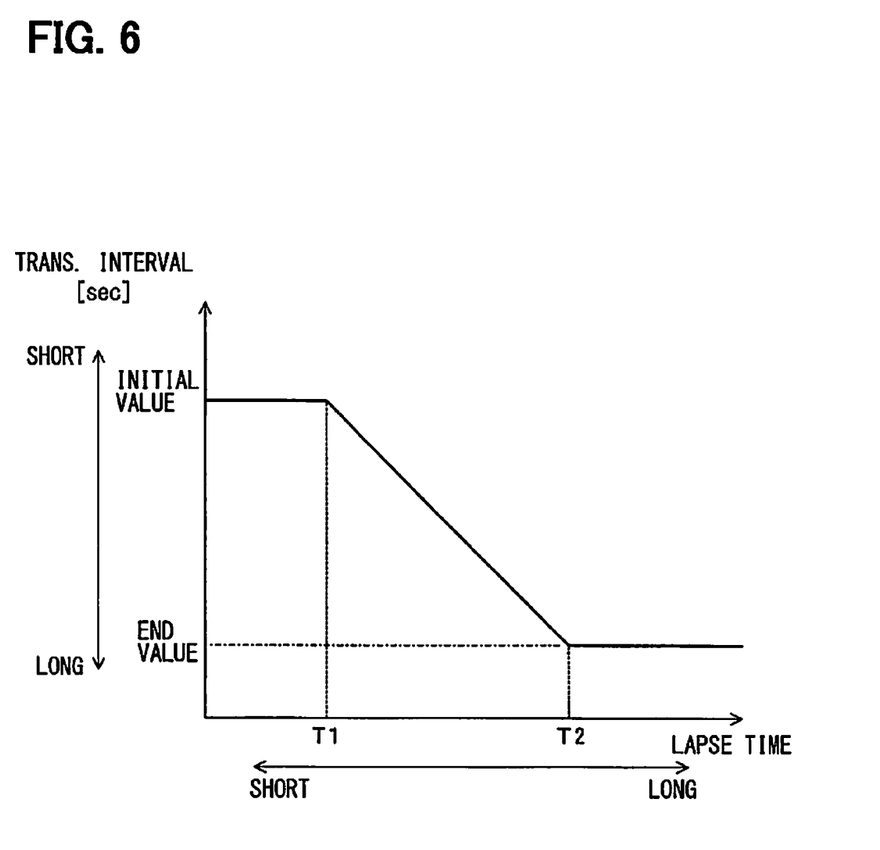
FIG. 6 is a diagram of a relationship between a transmission interval and a lapse time of a counter.

The transmission interval table is a table which relates the lapse time with the transmission interval, as shown in FIG. 6. The transmission interval is fixed to the initial value (e.g., 100 m sec) until the lapse time exceeds a preset period T1. Further, the transmission interval is set as an increasing interval for a time between the period T1 and a preset period T2. That is, as the lapse time increases in a T1-to-T2 period, so does the transmission interval. After the period T2, the transmission interval is fixed to the end value (e.g., 10 sec.).

Then, the controller 70 obtains the transmission interval from the table read in S440 as a value corresponding to the lapse time obtained in S430, and sets up the obtained transmission interval (S450).

Then, the controller 70 ends the transmission interval setting process, and returns the process to the information transmission setting process.

That is, in the present embodiment, even when the internal-combustion engine stops, or when the operation SW 80 is OFF, that is, when the preset transmission stop condition is satisfied, transmission of the position information is permitted when the movable object has a fault, or when the movable object is involved in an accident, that is, when the movable object is in an abnormal state.

Then, in the transmission interval setting process of the present embodiment, the transmission interval is increased as the lapse time after the satisfaction of the preset transmission stop condition and the detection of the abnormal state increases.

That is, when the lapse time after having abnormality in the movable object is long, the abnormality of the movable object may have already been attended and resolved. That is, when the movable object is involved in an accident, the movable object may have already been towed to a safe place. On the other hand, just after having abnormality in the movable object, the situation of the movable object may preferably be transmitted more frequently to the other communication device.

Therefore, in the transmission interval setting process, the transmission interval is configured to be increased as the lapse time after the satisfaction of the preset transmission stop condition and the detection of the abnormal state increases.

Effects of the Present Embodiment

As described above, even when the preset transmission stop condition is satisfied, the in-vehicle communication device 50 performs a periodic transmission of the position information as information communications when an abnormal state is detected. That is, in the in-vehicle communication device 50, even when the vehicle is in a situation where transmission of the position information should be suspended/stopped, the position information is transmitted during the abnormal state of the movable object.

As a result, an occupant of a near-by vehicle that is equipped with a receiver for receiving the position information from the in-vehicle communication device 50 can recognize the position of the movable object in the abnormal state.

On the other hand, the in-vehicle communication device 50 stops the periodic transmission of the position information in a following situation, i.e., when the preset transmission stop condition is satisfied but the abnormal state is not detected.

Therefore, according to the in-vehicle communication device 50, unnecessary transmission of the position information is reduced and the power consumption is reduced.

In other words, according to the in-vehicle communication device 50, the power consumption is reduced, while transmitting the required information.

Further, the movable object may preferably be determined as the abnormal state when the movable object at least has one of a fault (i.e., abnormality) or an accident.

In the information transmission setting process, whether at least one of the fault and the accident is determined (i.e., a determination of an accident-fault state) based on the operation state of the hazard lamp SW 44, or whether the airbag is developed, or whether a fault is caused in each of the ECUs 12, 14, 16, 18, or 20.

The reason why the operation state of the hazard lamp SW 44 is used/usable for the determination of the accident-fault state is that, when the preset transmission stop condition is satisfied and when the hazard lamp SW 44 is turned ON, it is probable that the movable object is stopping due to a fault (i.e., abnormality) or an accident.

The reason why the deployment of the airbag is used/usable for the determination of the accident-fault state is that, when the preset transmission stop condition is satisfied and when the airbag is deployed, it is probable that the movable object is stopping due to an accident.

The reason why having a fault in ECUs 12, 14, 16, 18, or 20 is used/usable for the determination of the accident-fault state is that, when the preset transmission stop condition is satisfied and when at least one of ECUs 12, 14, 16, 18, and 20 has a fault, it is probable that the movable object may not be safely operated.

That is, according to the above configuration of the information transmission setting process, when the movable object is having at least one of a fault (i.e., abnormality) or an accident, the position information on the movable object is transmitted to an other communication device. As a result, according to the in-vehicle communication device 50, the position of the movable object is notified to occupants of an other vehicles that has the other communication device, for example. That is, the position of the movable object that has a fault or is involved in an accident is quickly "broadcasted" or reported to other vehicles, thereby providing a safer road/traffic environment.

In case of theft of the movable object, it may be preferred that the in-vehicle communication device 50 performs a periodic transmission of the position information for the purpose of tracing the position of the movable object. Therefore, the information transmission setting process periodically transmits the position information, when the movable object is in theft even if the preset transmission stop condition is satisfied.

If the other communication device which receives the position information from the in-vehicle communication device 50 (of the movable object) is provided to a police station or a security company, the current position of the movable object is identifiable to the police or the security company, and the movable object is quickly locatable and recoverable.

Further, in the information transmission setting process, if the door of the movable object is in the door-opening state even when the preset transmission stop condition is satisfied, the position information is transmitted periodically. The reason why such configuration is used is that the other vehicles may collide with that opened door when the door of the movable object is opened. According to the in-vehicle communication device 50, the occupant of the vehicle having the other communication device which receives the position information is notified of the situation of the movable object, i.e., the movable object, thereby contributing to realize a safe road/traffic environment.

In the information transmission setting process of the present embodiment, even when the preset transmission stop condition is satisfied and the abnormal state is detected, in case that the current position of the movable object is not on a road, transmission of the position information is stopped. That is, when the movable object is parked in a garage and not on a road, it is less likely or not required for the other communication device to have the position information (of the movable object).

Therefore, the in-vehicle communication device 50 can reduce the consumption of electric power by stopping the transmission of the position information, when the current position of the movable object is not on a road even if the preset transmission stop condition is satisfied and the abnormal state is detected.

The transmission interval setting process of the present embodiment sets a longer transmission interval for the transmission of the position information, as the lapse time after detecting the abnormal state increases.

According to such an in-vehicle communication device 50, immediately after an abnormality is caused in the movable object, transmission of the position information is repeatable at a short interval, and when the lapse time after detecting abnormality increases, the transmission interval is increased.

That is, according to the in-vehicle communication device 50, traffic safety is guaranteed without compromising the reduction of transmission of the unnecessary position information.

OTHER EMBODIMENTS

Although the present disclosure has been fully described in connection with preferred embodiment thereof with reference to the accompanying drawings, it is to be noted that various changes and modifications become apparent to those skilled in the art.

For example, although, in the information transmission setting process of the above-mentioned embodiment, S180, S190, S200, S220, and S230 are performed for a determination of whether the abnormal state is caused. However, as a technical thought of the present disclosure, at least one of S180, S190, S200, S220, and S230 is required. That is, in the present disclosure, as long as at least one of S180, S190, S200, S220, and S230 is performed, S180 may be omitted, S190 may be omitted, S200 may be omitted, S220 may be omitted, and S230 may be omitted.

In the present disclosure, when S220 is omitted, S210 may also be omitted.

Further, the information transmission setting process in the above-mentioned embodiment uses: S240 for determining whether the current position of the movable object is on a road, and, if the current position of the movable object is on the road as a result of the determination (S240:YES), the transmission setting is set to ON (S250), and, if the current position of the movable object is not on the road (S240:NO), the transmission setting is set to OFF (S270).

However, S240 may be omitted in the present disclosure. In such case, when the abnormal state is detected, S250 may be performed.

In the information transmission setting process of the above-mentioned embodiment, S260 is used for performing the transmission interval setting process, the transmission interval setting process may be omitted.

Further, in the information transmission setting process of the above-mentioned embodiment, although S140 and S150 are performed as a determination of the preset transmission stop condition, at least one of S140 and S150 may be omitted in the present disclosure.

Further, the communication system 1 of the above-mentioned embodiment communicates/transmits the position information by the vehicle-to-vehicle communication to the in-vehicle system 5. However, the in-vehicle system 5 may use other communication method for performing information communications other than the vehicle-to-vehicle communication. For example, in the present disclosure, the in-vehicle system 5 may perform information communications by a road-to-vehicle communication.

The in-vehicle system may be installed not only in an automobile but also in other vehicles, such as a motor cycle, a bicycle, a ship, or an air plane. That is, as long as the in-vehicle system is installed in a movable object, the present disclosure is applicable and the advantages described above are receivable.

Further, a part of the configuration of the above-mentioned embodiment may be omitted as long as the subject matter of the present disclosure solves the problem. Further, the above embodiment may be combinable with the modification thereof. Further, as long as a scope of the claimed subject matter in "What is claimed is" section is interpretable to include a practical form of the communication device, such a form is one of the embodiments of the present disclosure.

What is claimed is:

1. A communication device that is installed in a movable object to perform information communication with an other communication device, the communication device comprising:
    a vehicle state obtainer obtaining state information indicative of a state of the movable object;
    a position obtainer obtaining position information that includes a position of the movable object;
    a stop condition determiner determining whether external information incoming from an external device satisfies a preset transmission stop condition for stopping a transmission of information via the information communication;
    an abnormality detector detecting that the movable object is in an abnormal state based on the state information obtained by the vehicle state obtainer; and
    a transmission controller performing the transmission of position information according to a satisfaction of the preset transmission stop condition, wherein
    when the transmission controller determines that (i) the stop condition determiner has determined that the preset transmission stop condition is satisfied and (ii) the abnormality detector has not detected the abnormal state, the transmission controller stops the transmission of the position information obtained from the position obtainer, and
    when the transmission controller determines that (i) the stop condition determiner has determined that the preset transmission stop condition is satisfied and (ii) the abnormality detector has detected the abnormal state, the transmission controller performs the transmission of the position information obtained from the position obtainer as the information communication.

2. The communication device of claim 1, wherein
    the abnormality detector detects the abnormal state of the movable object when the state information obtained from the vehicle state obtainer is an accident-fault state that indicates at least one of an abnormality of the movable object or an accident involving the movable object.

3. The communication device of claim 2, wherein
    the vehicle state obtainer obtains the state information based on an operation state of a hazard lamp switch that switches ON/OFF a hazard lamp on the movable object, and
    the abnormality detector detects the accident-fault state based on the state information indicating a switch ON operation state of the hazard lamp switch.

4. The communication device of claim 2, wherein
    the vehicle state obtainer obtains the state information based on a deployment state of an airbag, and
    the abnormality detector detects the accident-fault state based on the state information indicating that the airbag is deployed.

5. The communication device of claim 2, wherein
    the vehicle state obtainer obtains the state information indicating whether an other device installed in the movable object has a fault, and
    the abnormality detector detects the accident-fault state based on the state information indicating that the other device has a fault.

6. The communication device of claim 1, wherein
the abnormality detector detects the abnormal state when the state information from the vehicle state obtainer indicates that the movable object is in a stolen state.

7. The communication device of claim 6, wherein
the vehicle state obtainer obtains the state information indicating whether the movable object is in the stolen state from the other communication device operating outside of the movable object.

8. The communication device of claim 6, wherein
the vehicle state obtainer obtains, from a theft prevention device that is installed in the movable object, the state information based on the state information indicating whether the movable object is in the stolen state.

9. The communication device of claim 1, wherein
the movable object is an automobile,
the vehicle state obtainer obtains an open-closed state of a door of the movable object as the state information, and
the abnormality detector detects the abnormal state as the state information of the vehicle state obtainer indicating that the door of the movable object is in an open state.

10. The communication device of claim 1, wherein
the external device is an internal combustion engine, and
the stop condition determiner determines that the preset transmission stop condition is satisfied when the external information incoming from the external device in the movable object indicates that the engine is stopped.

11. The communication device of claim 1, wherein
when the external information is information regarding whether a transmission of the position information is required, which is indicated by an operation state of a transmission controller operation switch that is installed in the movable object, the stop condition determiner determines that the preset transmission stop condition is satisfied if the external information incoming from the transmission controller operation switch indicates that the transmission of the position information is not required.

12. The communication device of claim 1, wherein
the stop condition determiner determines based on external information that is transmitted from the other communication device and indicative of whether the other communication device is allowed to transmit position information, and
the stop condition determiner determines that the preset transmission stop condition is satisfied when the external information that is transmitted from the other communication device indicates that the transmission of the position information is prohibited.

13. The communication device of claim 1, wherein
the movable object is an automobile, and
the transmission controller stops the transmission of the position information when the position information from the position obtainer indicates that a current position of the movable object is not on a road.

14. The communication device of claim 1, wherein
the vehicle state obtainer repeatedly obtains the state information,
the position obtainer repeatedly obtains the position information,
the stop condition determiner determines whether the state information satisfies the preset transmission stop condition when the stop condition determiner obtains the state information, and
the transmission controller is equipped with a transmission interval adjuster that
(i) performs the transmission of position information at predetermined intervals when the stop condition determiner determines that the preset transmission stop condition is satisfied and the abnormality detector detects the abnormal state, and
(ii) sets a longer transmission interval in proportion to an amount of a lapse time after the detection of the abnormal state by the abnormality detector when the stop condition determiner determines that the preset transmission stop condition is satisfied and the abnormality detector detects the abnormal state.

* * * * *